(12) United States Patent
van Ginkel et al.

(10) Patent No.: US 10,415,654 B2
(45) Date of Patent: Sep. 17, 2019

(54) METHOD FOR SEARCHING FOR A MINIMUM OF A MULTI-DIMENSIONAL SURFACE

(71) Applicant: Dana Automotive Systems Group, LLC., Maumee, OH (US)

(72) Inventors: Johannes van Ginkel, Melden (BE); Ben Goyens, Zoersel (BE)

(73) Assignee: Dana Automotive Systems Group, LLC, Maumee, OH (US)

( * ) Notice: Subject to any disclaimer, the term of this patent is extended or adjusted under 35 U.S.C. 154(b) by 234 days.

(21) Appl. No.: 15/470,524

(22) Filed: Mar. 27, 2017

(65) Prior Publication Data
US 2017/0284479 A1 Oct. 5, 2017

Related U.S. Application Data

(60) Provisional application No. 62/314,555, filed on Mar. 29, 2016.

(51) Int. Cl.
| | |
|---|---|
| *F16D 48/06* | (2006.01) |
| *F16D 13/68* | (2006.01) |
| *B60W 10/02* | (2006.01) |
| *F16D 13/54* | (2006.01) |
| *F16D 45/00* | (2006.01) |

(Continued)

(52) U.S. Cl.
CPC ............ *F16D 13/683* (2013.01); *B60K 17/34* (2013.01); *B60K 23/08* (2013.01); *B60W 10/02* (2013.01); *F16D 13/54* (2013.01); *F16D 45/00* (2013.01); *F16D 48/00* (2013.01); *F16H 63/46* (2013.01); *B60K 2023/0858* (2013.01); *B60K 2023/0875* (2013.01); *B60W 2710/027* (2013.01); *F16D 27/115* (2013.01); *F16D 2001/103* (2013.01)

(58) Field of Classification Search
CPC ....................................................... F16D 48/06
See application file for complete search history.

(56) References Cited

U.S. PATENT DOCUMENTS

| | | | |
|---|---|---|---|
| 5,208,763 A | 5/1993 | Hong et al. | |
| 6,050,379 A * | 4/2000 | Lyon ...................... | F16D 28/00 |
| | | | 192/54.1 |

(Continued)

FOREIGN PATENT DOCUMENTS

| | | |
|---|---|---|
| JP | 2009537926 A | 10/2009 |
| JP | 2016003751 A | 1/2016 |

OTHER PUBLICATIONS

Japanese Patent Office, Japanese Office Action issued in Application 2017-062995, dated Mar. 30, 2018, 5 pages.

*Primary Examiner* — Edwin A Young
(74) *Attorney, Agent, or Firm* — Marshall & Melhorn, LLC

(57) ABSTRACT

Provided herein is a method for calibrating a clutch by searching for the minimum of a multi-dimensional surface including determining the error between a spline function and recorded data relating to clutch characteristics, creating a multi-dimensional surface corresponding to the error values, determining the minimum of the multi-dimensional surface using the steps of performing a Steepest Gradient & Direction determination step and conducting a Golden Section Search and Switch Direction Step to find a minimum that meets a predetermined closing condition. Additionally, provided herein is a computer-implemented system for calibrating the clutch.

12 Claims, 6 Drawing Sheets

(51) Int. Cl.
*F16H 63/46* (2006.01)
*B60K 17/34* (2006.01)
*B60K 23/08* (2006.01)
*F16D 48/00* (2006.01)
F16D 1/10 (2006.01)
F16D 27/115 (2006.01)

(56) References Cited

U.S. PATENT DOCUMENTS

| | | |
|---|---|---|
| 7,200,476 B2 | 4/2007 | Cawthorne et al. |
| 7,729,839 B2 | 6/2010 | Claussen et al. |
| 8,200,403 B2 | 6/2012 | Heap et al. |
| 8,457,388 B2 | 6/2013 | Chen et al. |
| 8,948,982 B2 | 2/2015 | Elliott |
| 2010/0036510 A1 | 2/2010 | Cullen |
| 2013/0213760 A1* | 8/2013 | Wilson .................. F16D 48/066 192/85.63 |
| 2014/0277977 A1* | 9/2014 | Neelakantan ........... F16D 48/06 701/68 |
| 2014/0324309 A1* | 10/2014 | Karpenman ............ F16D 48/06 701/68 |
| 2015/0176663 A1 | 6/2015 | Paielli et al. |

* cited by examiner

METHOD FOR SEARCHING FOR A MINIMUM OF A MULTI-DIMENSIONAL SURFACE

RELATED APPLICATION

The present application claims priority to and the benefit from Provisional U.S. Patent Application Ser. No. 62/314,555 filed on Mar. 29, 2016. The content of the above-noted patent application is hereby expressly incorporated by reference into the detailed description of the present application

BACKGROUND

This disclosure is related to an improved method for searching for a minimum of a multi-dimensional surface. More, particularly, an algorithm for determining the minimum of a multi-dimensional surface used in a calibration procedure for a clutch.

The control of an electromechanical actuated rear differential unit (RDU) with one or more clutches must be robust against changing conditions, including wear of the clutches. A clutch is a mechanical device used to transfer power from one rotating shaft to another rotating shaft. When the clutch is actuated (i.e. compressed) and slipping, torque can be transferred from one shaft to the other, of which the amount depends on the normal force applied on the clutch and the level of slip. When the clutch is fully disengaged (i.e. decompressed), the shafts are decoupled and no torque is transferred. The clutch kiss point is the physical position at which the clutch its driving plates meet the clutch its driven clutch plates and starts to deliver torque. When the clutch is transferring torque the friction material of the plates will decrease. As a consequence, the amount of compression needed to engage a clutch to specific levels of transfer torque varies as the clutch wears. To improve the operation of a clutch system the system can be adapted to the unique characteristics of each clutch in order to compensate for the wear of the clutches.

To adapt to these changing conditions, methods are used to update the relationship between the applied actuator position and the applied normal force on the clutch. This relationship can be modeled by fitting a spline function to recorded data to provide as much accuracy as possible. The difficulty lies in finding the optimal spline fit. The optimal spline fit has the least amount of error with respect to the recorded data.

A multi-dimensional surface can be used to represent the error between the actual recorded data and a spline function fit with varying parameters. Each point on the multi-dimensional surface corresponds to an error value of a spline function. Minimizing the error of the spline function and thus finding the minimum of the multi-dimensional surface is the desired goal. Many of the search algorithms designed for multi-dimensional surfaces use derivatives in order to find the local or global extrema of the surface. However, running these algorithms using embedded central processing units create timing problems because calculating derivatives requires that either the exact function of the surface to be known or many iterations of the algorithms have to be executed before the derivative is known. Limiting the load placed on the central processing units and execution time of the algorithm is desired.

Additionally, the shape of the multi-dimensional surface can create issues when implementing the existing search algorithms. When the multi-dimensional surface has a large region of minimum values, variations between function values are small compared to the variations in function values closer to the outer boundaries making achieving an accurate overall minimum is difficult.

One algorithm used for determining the minimum is the brute force method which evaluates all data points within a boundary sequentially and when a new minimum value is found, the previous value is overwritten. Another advanced algorithm used for multi-dimensional surfaces, which does not use any derivatives, is the Nelder-mead (Simplex) method. This method uses a simplex (e.g. a triangle) constructed out of test points and in each iteration, the test points are evaluated and determined to expand, contract or reduce the simplex. The heuristic character of this algorithm does not always guarantee the optimal solution and an accurate minimum.

The Golden Section Search (GSS) is another known algorithm used to find extremes of two-dimensional unimodal functions within certain boundaries. The GSS algorithm uses three points whose distances form a golden section ratio. The function values of the three points are calculated and the point corresponding to the highest value is disregarded. A new point is then positioned between the two remaining points based on the golden section ratio. The known GSS algorithm is very robust and accurate in finding minima of two-dimensional lines; however, it is not used for multi-dimensional surfaces.

Therefore, a need exists for a method for determining the minimum of a multi-dimensional surface that limits the load placed on the control processing unit, reduces the execution time of the algorithm and accurately detects the minimum.

SUMMARY

Provided herein is a method for calibrating a clutch by searching for the minimum of a multi-dimensional surface including the steps of: obtaining a set of measured characteristics of the clutch over an actuation sequence; determining a set of spline functions to fit the measured characteristics; determining error values between the spline functions and the measured characteristics; creating a multi-dimensional surface representing the error values; calculating the gradient of the multi-dimensional surface in the zx, zy, and z directions in the boundary area; determining the direction of the steepest gradient of the multi-dimensional surface in the zx, zy, and z directions; defining an initial xy-line using the steepest gradient as the slope and an end point; performing a first Golden Section Search step to identify an initial minimum; defining a second line using the initial minimum and switching the direction of the slope of the initial line; performing a second Golden Section Search step to identify a second minimum; calculating a distance between the initial minimum and the second minimum; comparing the distance to a predetermined condition; proceeding in an iterative manner in defining a new line using the second minimum and switching the direction of slope of the second line and performing a third Golden Section Search until the predetermined condition is met; returning an overall minimum; identifying a best fit spline function corresponding to the overall minimum; and using the spline function to calibrate the clutch.

Additionally provided herein is a computer-implemented system for calibrating a clutch, the computer-implemented system including: a digital processing device having an operating system configured to perform executable instructions and a memory device; a computer program including instructions executable by the digital processing device, the computer program comprising a software module configured to manage the operation of the clutch; a control system including a control unit and an actuator in communication with the clutch; and a plurality of sensors in communication with the control system configured to monitor clutch characteristics. The software module includes a plurality of software sub-modules configured to determine the operational conditions for the clutch based at least in part on one of the clutch characteristics monitored by the plurality of sensors.

BRIEF DESCRIPTION OF THE DRAWINGS

The novel features of the preferred embodiments are set forth with particularity in the appended claims. A better understanding of the features and advantages of the present embodiments will be obtained by reference to the following detailed description that sets forth illustrative embodiments, in which the principles of the preferred embodiments are utilized, and the accompanying drawings of which:

DETAILED DESCRIPTION OF THE PREFERRED EMBODIMENTS

It is to be understood that the embodiments may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the expressly stated otherwise.

Figure 1:
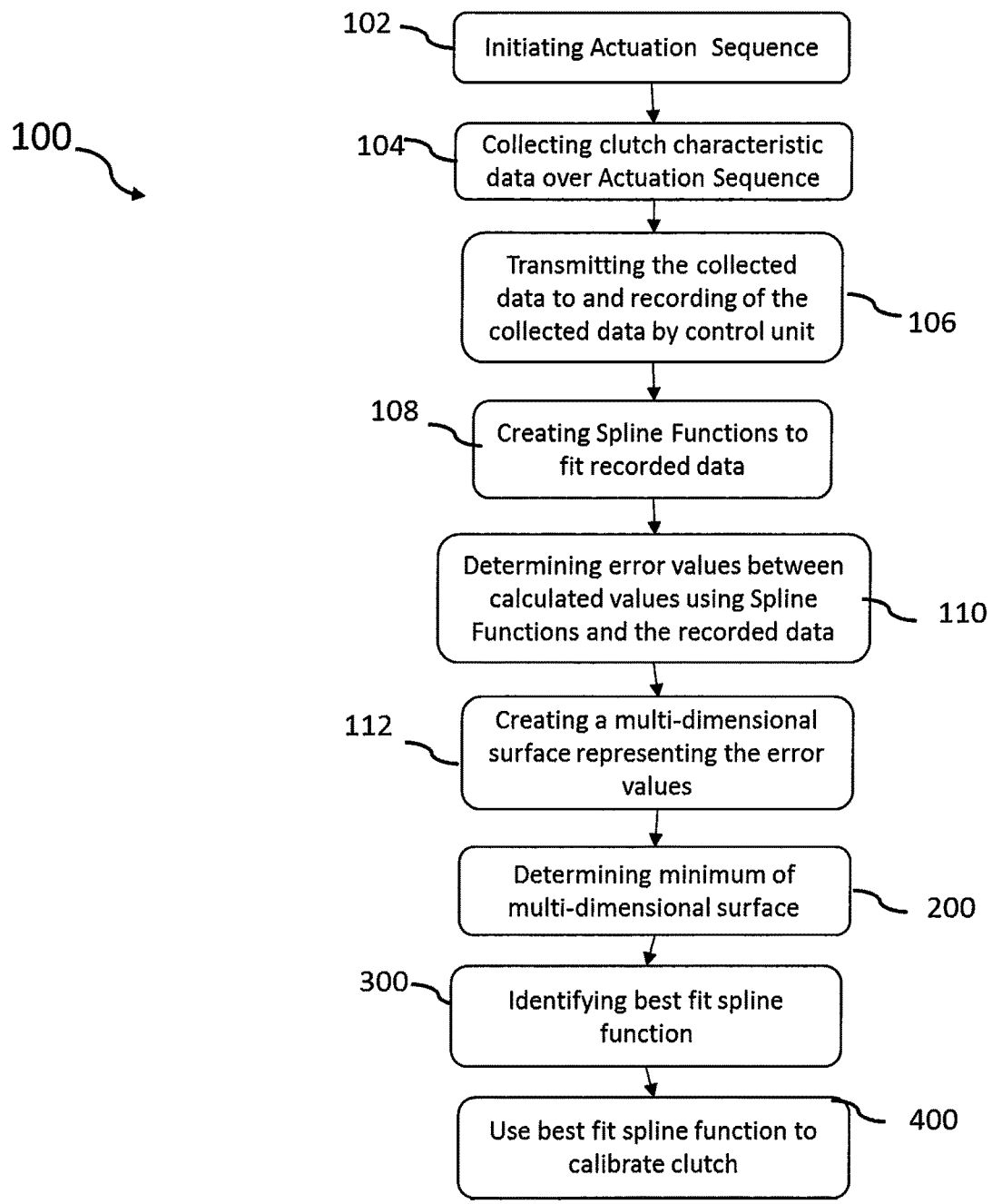
FIG. 1 is a flow diagram of a method according to a preferred embodiment.

FIG. 1 depicts a method for calibrating a clutch using a control system. In some embodiments, the control system and clutch are part of a motor vehicle. The control system performs a method for determining the minimum of a multi-dimensional surface to calibrate the clutch for use in a motor vehicle. The disclosure also relates to a computer program, a computer program product and a computer system for implementing the method.

Those of skill will recognize that the various illustrative logical blocks, modules, circuits, strategies, schemes, and algorithm steps described in connection with the embodiments disclosed herein, including with reference to the control system described herein, for example, is optionally implemented as electronic hardware, software stored on a computer readable medium and executable by a processor, or combinations of both.

To clearly illustrate this interchangeability of hardware and software, various illustrative components, blocks, modules, circuits, strategies, schemes, and steps have been described above generally in terms of their functionality. Whether such functionality is implemented as hardware or software depends upon the particular application and design constraints imposed on the overall system. Skilled artisans could implement the described functionality in varying ways for each particular application, but such implementation decisions should not be interpreted as causing a departure from the scope of the present embodiments. For example, various illustrative logical blocks, modules, strategies, schemes, and circuits described in connection with the embodiments disclosed herein is optionally implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor is optionally a microprocessor, but in the alternative, the processor is optionally any conventional processor, controller, microcontroller, or state machine. A processor is also optionally implemented as a combination of computing devices, e.g., a combination of a DSP and a microprocessor, a plurality of microprocessors, one or more microprocessors in conjunction with a DSP core, or any other such configuration.

Software associated with such modules optionally resides in RAM memory, flash memory, ROM memory, EPROM memory, EEPROM memory, registers, a hard disk, a removable disk, a CD-ROM, or any other suitable form of storage medium known in the art. An exemplary storage medium is coupled to the processor such that the processor is capable of reading information from, and writing information to, the storage medium. In the alternative, the storage medium is optionally integral to the processor. The processor and the storage medium optionally reside in an ASIC. For example, in one embodiment, a controller for use of control of the clutch includes a processor (not shown).

In some embodiments, the control system herein includes a digital processing device, or use of the same including one or more hardware central processing units (CPU) that carry out the system's functions. In still further embodiments, the digital processing device further includes an operating system configured to perform executable instructions. In some embodiments, the digital processing device is optionally connected to a computer network. In further embodiments, the digital processing device is optionally connected to the Internet, a cloud computing infrastructure, an intranet or a data storage device.

In accordance with the description herein, suitable digital processing devices include, by way of non-limiting examples, server computers, desktop computers, laptop computers, notebook computers, handheld computers, Internet appliances, mobile smartphones and tablet computers. In some embodiments, the digital processing device includes an operating system configured to perform executable instructions. The operating system is, for example, software, including programs and data, which manages the device's hardware and provides services for execution of applications.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile. In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the control system for the clutch disclosed herein includes at least one computer program, or use of the same. A computer program includes a sequence of instructions, executable in the digital processing device's CPU, written to perform a specified task. Computer readable instructions are optionally implemented as program modules, such as functions, objects, Application Programming Interfaces (APIs), data structures, and the like, that perform particular tasks or implement particular abstract data types. In light of the disclosure provided herein, those of skill in the art will recognize that a computer program is optionally written in various versions of various languages.

The functionality of the computer readable instructions are optionally combined or distributed as desired in various environments. In some embodiments, a computer program includes one sequence of instructions. In some embodiments, a computer program includes a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In order to accurately control a clutch, it is beneficial for the control system to determine the characteristics of the clutch. The characteristics of the clutch include, but are not limited to the relationship between normal force on the clutch versus the actuator position (amount of compression of the clutch) and the friction coefficient. In some embodiments, the control system includes an actuator connected to the clutch and in communication with a control unit or controller. The clutch may be (disengaged and engaged) controlled by an actuator. The actuator may be a hydraulic, electromechanical, electromagnetic, pneumatic, or any other type of actuator that can be used to compress a clutch to a desired level.

In one embodiment, the clutch is controlled to deliver a specific level of transmitted torque to a locking device in a motor vehicle. The actuator supplies power to the clutch to selectively engage and disengage the locking device to desired levels of transmitted torque. The control system can calibrate the clutch based on the current or voltage supplied to the actuator.

The control system is connected to a set of sensors used to sense characteristics of a clutch and the actuator. In one embodiment, the sensors monitor the position of the clutch and the current supplied to the actuator. In further embodiments, the sensors are speed sensors that detected the measure of slip speed. The control unit receives input signals from one or more of the sensors that are indicative of various operational characteristic of the clutch or actuator.

As depicted in FIG. 1, the method for calibrating the clutch 100 includes the step of the control unit sending a signal to the actuator to begin an actuation sequence 102. The sensors collect data regarding the characteristics of the clutch over the actuation sequence 104. The data is collected by the sensors and transmitted to the control unit 106. The collected data can be recorded/stored in a memory device connected to or included within the control system. In one embodiment, the sensors record values relating to the motor position and the current used by the actuator to achieve this position.

The control unit then processes the collected data and creates an initial spline function that fits to the recorded data 108. A set of spline functions are obtained by shifting a starting point and an end point of the spline function, respectively the x and y values forward or backwards within a predetermined boundary 112. In one embodiment, the starting points range respectively from −400° to 400° for x values and −100° to 500° for y values. The starting and end points or values can change depending on the specific application. A multi-dimensional surface incorporating x and y values is created and is used to create a spline function for each set of x and y values. Other functions beyond spline functions that can fit a curve on a set of data can be used in this step and additional dimensions in the multi-dimensional surface are possible.

Next, the control system completes an error analysis comparing the values produced by the spline functions to the recorded data 110 and creates a multi-dimensional surface representing the error values within the predetermined boundary 112. In one embodiment, the error analysis is conducted using a root-mean-square function; however, other functions which are used to determine error can be used. Once a multi-dimensional surface of the error values is defined, the control system performs a method for determining the minimum of the multi-dimensional surface 200.

Figure 2:
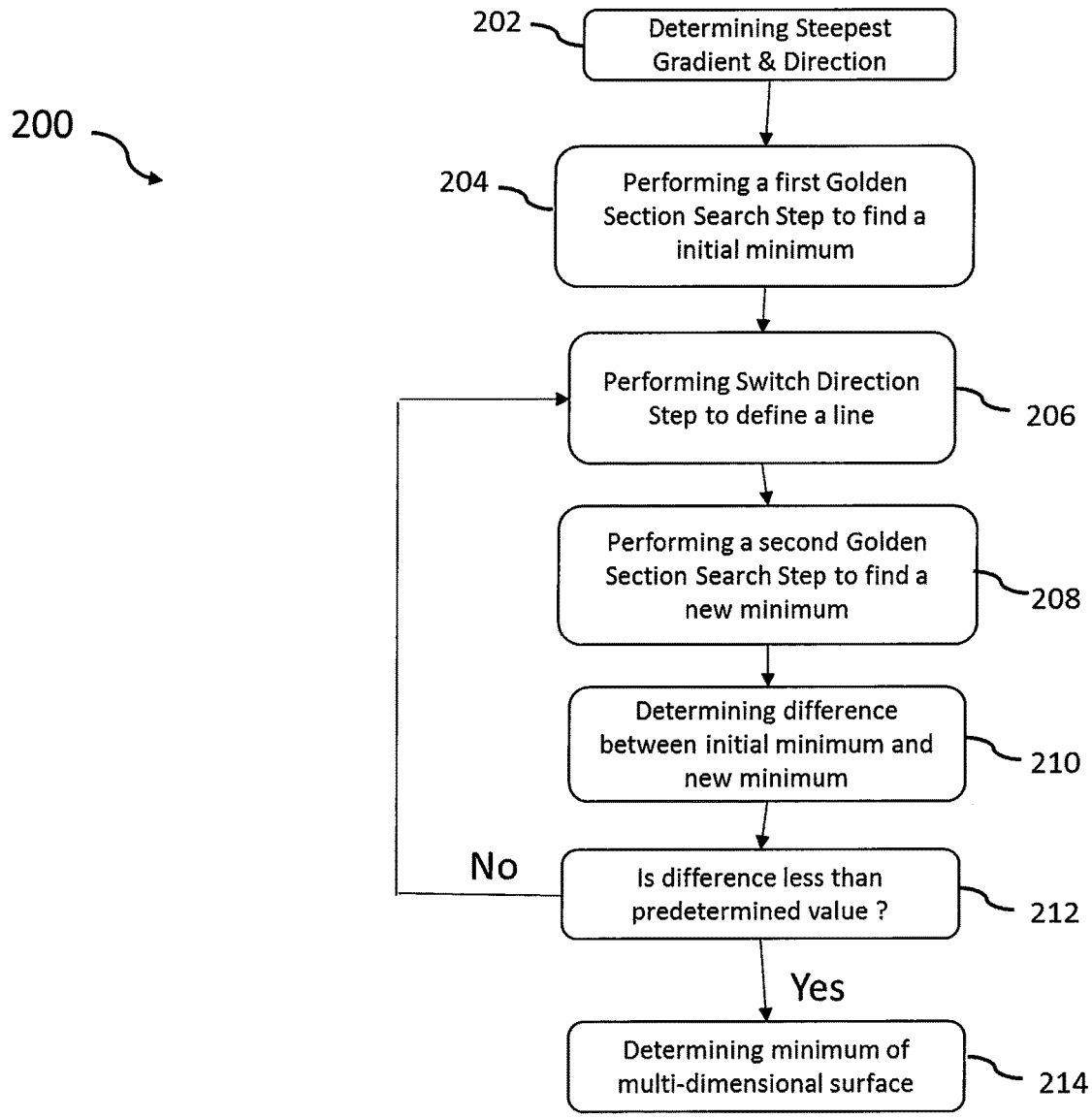
FIG. 2 is a flow diagram of a step of the method according to FIG. 1.

FIG. 2 depicts a method for determining the minimum of the multi-dimensional surface 200 including the steps of: determining a Steepest Gradient & Direction of a multi-dimensional surface to define an initial line 202, performing a recursive algorithm including performing a first Golden Section Search to find an initial minimum 204, a conducting Switch Direction step to define a second line 206, performing a second Golden Section Search to find a new minimum 208, determining the distance between the initial minimum and new minimum 210, and comparing the distance to a predetermined value 212.

Figure 3:
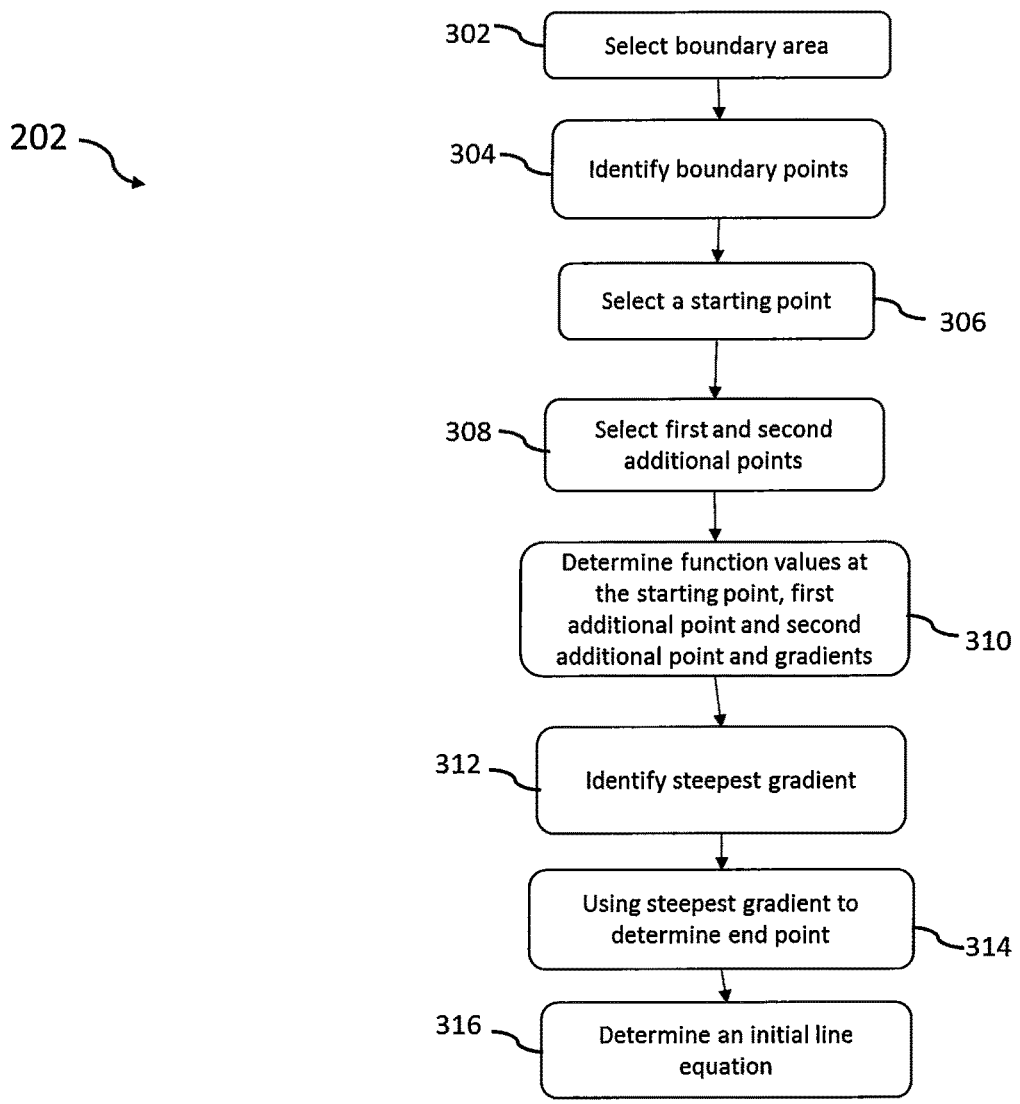
FIG. 3 is a flow diagram of a step of the method according to FIG. 2.

The first step of the method is the Steepest Gradient and Direction determination 202. FIG. 3 depicts the method for determining the Steepest Gradient and Direction including the steps of selecting boundary values for a specific application 302. A set of extreme boundary points within a defined boundary for x and y values are identified 304. The defined boundary area will vary depending on the application and specific properties of the clutch. In one embodiment, those extreme boundary points correspond to the minimum shift start and shift end values and maximum shift start and shift end values, [−400,−100], [400,500] respectively. Next, a starting point is selected 306. In one preferred embodiment, the starting point is one of the extreme boundary points corresponding to the lowest error value.

The method continues by evaluating first and second additional points on the multi-dimensional surface which are located within a predetermined range. The predetermined range is established base on the starting point and will help in the determination of the (steepest) gradient in the next step 308. In one embodiment, the first and second additional points are determined by moving the starting point by 15 percent of the allowed predetermined range respectively in the x direction and y direction. The 15 percent value can change depending on the application and its specific behavior. The control unit then determines the corresponding error value of the starting point, first additional point and second additional point and the gradients of the multi-dimensional surface in the zx, zy and z directions are calculated 310.

Next, the steepest gradient/slope previously calculated for the multi-dimensional surface is identified and selected 312. The control unit then uses the direction of the steepest gradient to determine an end point. within the predefined boundary for the x and y values 314. The end point is the location where a line beginning at the starting point and having the slope of the steepest gradient crosses the boundary set for the x and y values.

Having determined the direction of the steepest gradient, the starting point and endpoint, the control unit can produce an initial x-y line equation 316. The direction of the steepest gradient is used to define the slope of the x-y line.

Figure 4:
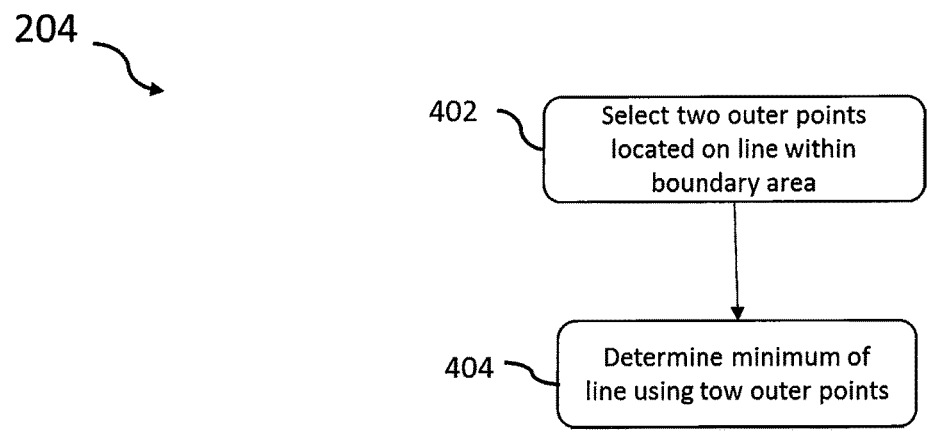
FIG. 4 is a flow diagram of a step of the method according to FIG. 2.

The x-y line returned by the Steepest Gradient & Direction determination step 202 is then used by the GSS step 204 to determine an initial minimum on the x-y line. The GSS step 204 selects the two outer points of the initial x-y line produced by Steepest Gradient & Directional determination 402 located on the minimum and maximum allowed boundaries for x and y and, starting from the outer two points the GSS determines the minimum of the spline function value located on the line 406 as depicted in FIG. 4. Internally, the GSS step may have its own tunable tolerance which determines when a second minimum has been found.

Figure 5:
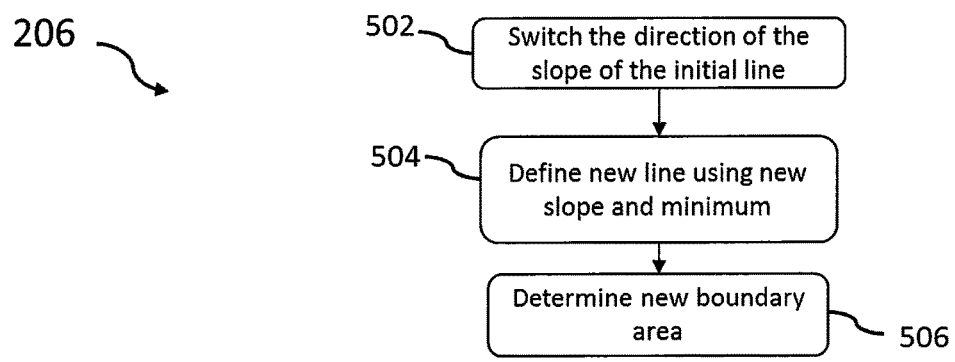
FIG. 5 is a flow diagram of a step of the method according to FIG. 2.

After the second minimum has been found, the Switch Direction step 206 is performed as depicted in FIG. 5. The slope of the initial x-y line calculated by the initial Steepest Gradient & Direction is utilized and the direction of the slope is switched to define a new slope/direction 502. The second minimum calculated from the GSS step 208 and the new slope is used to define a second x-y line 504. In one preferred embodiment, the direction of the initial line is switched by 90 degrees; however, it is understood that other angles of directional change may be used depending on the needs of a particular application. The first directional switch will result in a second line that stretches within the original boundary area.

In one preferred embodiment of the method, after conducting the second Switch Direction step, a new boundary area from which a new minimum is determined 506 can be decreased in size compared to the initial boundary area. The decrease in boundary size results in fewer iterations of the GSS 204 and Switch Direction Steps 206 in the method. In one preferred embodiment, the boundary area is decreased by 50% of the original size and located around the latest found minimum; however, it is understood that other percentage decrease can be selected as required to tune the method for a specific application.

As depicted in FIG. 2, after each performance of the GSS step 202 beyond the second minimum determination 208, the method calculates the distance between the new minimum and the previously determined minimum for both the x-value and the y-value separately. For example, after the determination of the second minimum, the second minimum is compared to the initial minimum 212. If the change in value of the x and y values (or distance between the two minimums) is less than a predetermined value or closing condition, the method will stop and return the overall minimum of the multi-dimensional surface 214.

If not, the steps of Switch Direction 206 and GSS 208 are reiteratively repeated until the change between two successively determined minimums (i.e. between the second and the third minimum, or the third and the fourth minimum, or the fourth and the fifth minimum . . . ) 210 meets the predetermined closing condition 212.

In one embodiment, the overall XY-distance between the two minimums is used to check the closing condition, but both values could also be used separately to increase accuracy of the method if desired. In one preferred embodiment, the predetermined closing condition is 1 degree of rotation; however, it is understood that the value can change depending on the needs of a particular application. Once the predetermined closing condition is met, the method returns an overall minimum value.

In another embodiment, this method can be used to detect the maxima of the multi-dimensional surface instead of the minimum in a similar manner.

As depicted in FIG. 1, after the overall minimum is identified 200, the control unit identifies a best fit spline function which is the spline function associated with the minimum 300. The best fit spline function is then used to calibrate the clutch 400.

Figure 6:
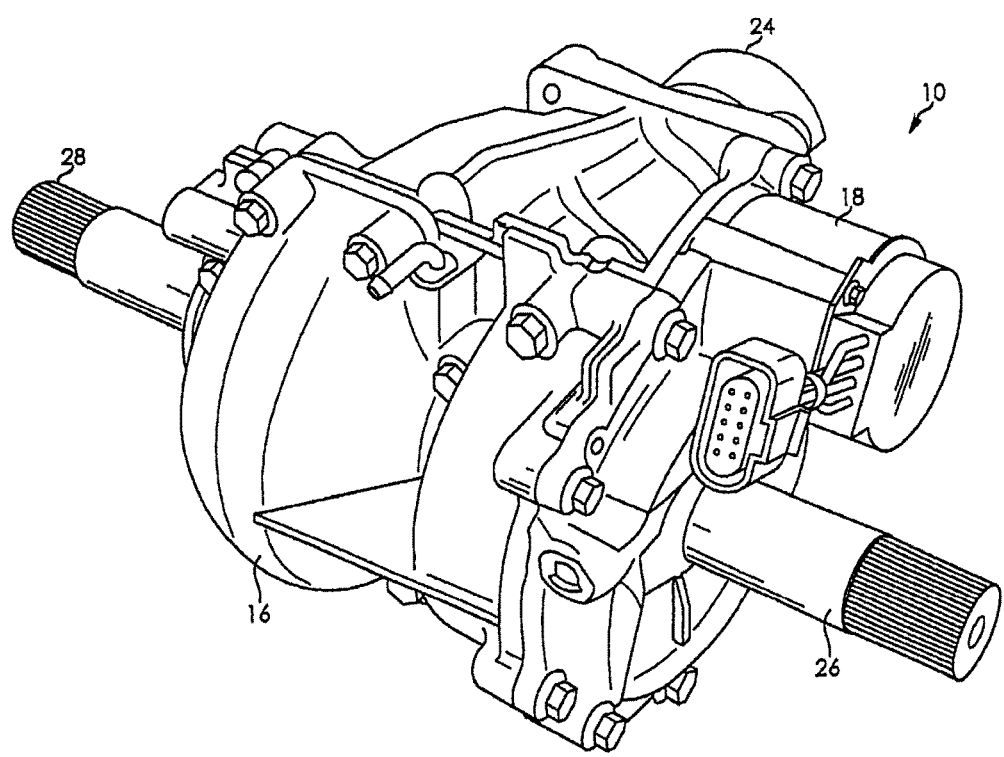
FIG. 6 is a perspective view of a disconnect unit according to a preferred embodiment.
Figure 7:
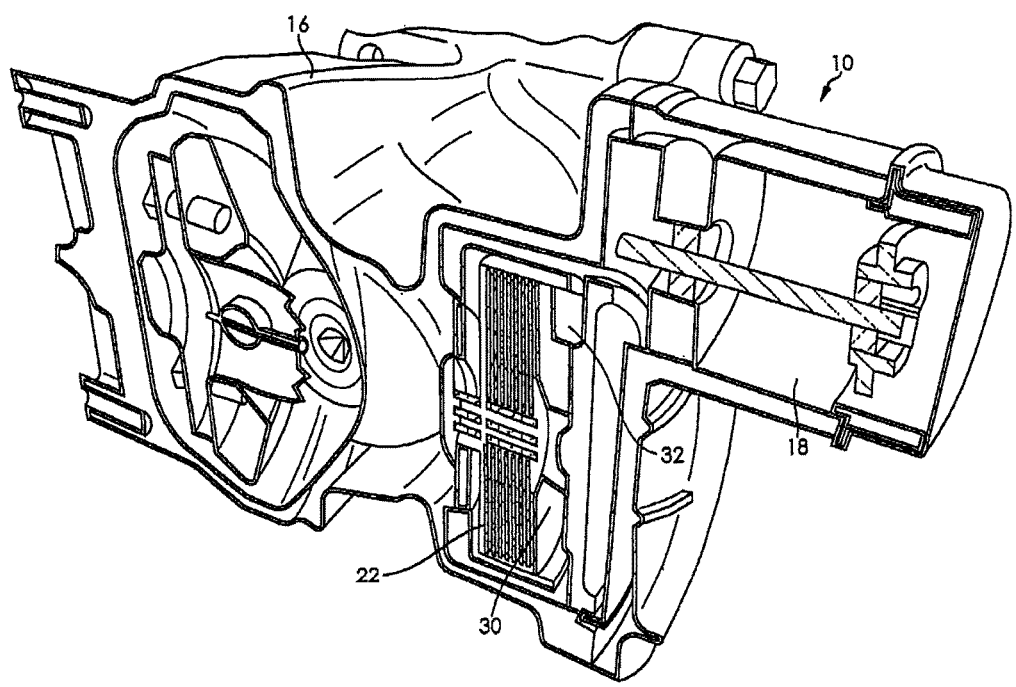
FIG. 7 is a cross sectional side view of rear disconnect unit of FIG. 6.

In one embodiment, the control system is used for an electromechanical actuated differential unit 10 with one or more clutches 30 as depicted in FIGS. 6 and 7. The control unit can be in communication with additional electronic components that manage torque conduction through a vehicle drive axle assembly, for example, a rear differential drive axle assembly. The control system is attached to an electric motor driven actuator 18 that controls the clamping forces applied by the clutch 30.

In further embodiments, the control system (not shown) and clutch can be connected to a front axle disconnect unit, front axle limited slip differential or a rear axle limited slip differential or any application where the transmitted torque of a clutch or normal force on a clutch has to be controlled.

In one preferred embodiment, the method described above can be implemented using a computer-implemented system for calibrating a clutch. The computer-implemented system can include a digital processing device including an operating system configured to perform executable instructions and a memory device. Further, the computer-implemented system can include a computer program including instructions executable by the digital processing device. The computer program includes software modules configured to manage the operation of the clutch. The software modules include a plurality of software sub-modules configured to determine optimal operational conditions for the clutch based at least in part on one of the clutch characteristics monitored by the plurality of sensors. The software sub-modules are configured to perform steps of the method 100 including, but not limited to, fitting the clutch characteristics values to spline function, producing a multi-dimensional surface representing the error values between the spline function and the clutch characteristics.

In accordance with the provisions of the patent statutes, the embodiments have been described in what is considered to represent its preferred embodiments. However, it should be noted that the embodiments can be practiced otherwise than as specifically illustrated and described without departing from its spirit or scope.

What is claimed:

1. A method for calibrating a clutch by searching for the minimum of a multi-dimensional surface, comprising:
    executing a plurality of steps by a computer-implemented system, wherein the steps comprise:
        obtaining a set of measured characteristics of the clutch over an actuation sequence;
        determining a set spline functions to fit the measured characteristics;
        determining error values between the spline functions and the measured characteristics;
        creating a multi-dimensional surface representing the error values;

calculating a gradient of the multi-dimensional surface in zx, zy, and z directions in a boundary area;

determining a direction of a steepest gradient of the gradients of the multi-dimensional surface in the zx, zy, and z directions;

defining an initial line using the steepest gradient as a slope, a starting point and an end point;

performing a first Golden Section Search step to identify an initial minimum;

defining a second line using the initial minimum and switching the direction of the slope of the initial line;

performing a second Golden Section Search step to identify a second minimum;

calculating a distance between the initial minimum and the second minimum;

comparing the distance to a predetermined condition;

proceeding in an iterative manner in defining a new line using the second minimum and switching a direction of slope of the second line and performing a third Golden Section Search until the predetermined condition is met;

returning an overall minimum;

identifying a best fit spline function that corresponds to the overall minimum; and using the best fit spline function to calibrate the clutch.

2. A method for calibrating a clutch according to claim 1, wherein the step of determining the error values between the spline functions and the measured characteristics includes using a root-mean-square function.

3. A method for calibrating a clutch according to claim 1, wherein switching the direction of the slope includes switching the direction of the slope by 90 degrees.

4. A method for calibrating a clutch according to claim 1, wherein the step of performing a Golden Section Search includes defining a boundary area, selecting two outer points within the boundary area, determining the minimum starting from the outer points.

5. A method for calibrating a clutch according to claim 1, wherein the step of defining the second line using the initial minimum and switching the direction of the initial line further includes determining a new boundary area.

6. The method for calibrating a clutch according to claim 5, wherein the new boundary area is reduced by at least 50 percent.

7. The method for calibrating a clutch according to claim 1, wherein the step of calculating the gradient of the multi-dimensional surface in the zx, zy, and z directions in the boundary area comprises:

selecting a starting point, a first additional point, and a second additional point;

determining the spline function values at the starting point, the first additional point, and the second additional point;

and calculating the gradient of the multi-dimensional surface in the zx, zy, and z directions.

8. The method according to claim 7, wherein the first additional point and the second additional point are within a range of 15 percent of the value of the starting point.

9. The method for calibrating a clutch according to claim 1, wherein the clutch characteristics include a relation between actuator position and an applied normal force on a clutch pack.

10. A computer-implemented system for calibrating a clutch, the computer-implemented system comprising:

a digital processing device comprising an operating system configured to perform executable instructions and a memory device;

a computer program including instructions executable by the digital processing device, the computer program comprising a software module configured to manage an operation of the clutch;

a control system including a control unit and an actuator in communication with the clutch; and a plurality of sensors in communication with the control system configured to monitor clutch characteristics; and wherein the software module includes a plurality of software sub-modules configured to determine optimal operational conditions for the clutch based at least in part on one of the clutch characteristics monitored by the plurality of sensors, and wherein the software module further comprises a module configured to fit the monitored clutch characteristics values to spline functions and a module configured to produce a multi-dimensional surface representing error values between the spline functions and the monitored clutch characteristics.

11. The computer-implemented system of claim 10, wherein the actuator is an electromechanical actuator.

12. The computer-implemented system of claim 10, wherein the clutch characteristics include a level of compression of the clutch and an applied normal force on a clutch pack.

* * * * *